United States Patent
Srnec et al.

(10) Patent No.: US 10,538,211 B2
(45) Date of Patent: Jan. 21, 2020

(54) LOAD MANAGEMENT IN A TRANSPORT UNIT OF A SELF-CONTAINED CLIMATE CONTROLLED STORAGE UNIT

(71) Applicant: THERMO KING CORPORATION, Minneapolis, MN (US)

(72) Inventors: Matthew Srnec, Minnetonka, MN (US); Paul J. Kroes, Eden Prairie, MN (US)

(73) Assignee: Thermo King Corporation, Minneapolis, MN (US)

( * ) Notice: Subject to any disclaimer, the term of this patent is extended or adjusted under 35 U.S.C. 154(b) by 218 days.

(21) Appl. No.: 15/395,209

(22) Filed: Dec. 30, 2016

(65) Prior Publication Data
US 2018/0186317 A1    Jul. 5, 2018

(51) Int. Cl.
*B60R 16/03* (2006.01)
*H02J 7/00* (2006.01)
*B60H 1/32* (2006.01)

(52) U.S. Cl.
CPC ........ *B60R 16/0307* (2013.01); *B60H 1/3211* (2013.01); *B60H 1/3226* (2013.01); *H02J 7/0068* (2013.01)

(58) Field of Classification Search
CPC .. B60R 16/0307; B60H 1/3226; B60H 1/3211
See application file for complete search history.

(56) References Cited

U.S. PATENT DOCUMENTS

| | | | | |
|---|---|---|---|---|
| 2,791,102 | A | * | 5/1957 | Kleist ................ B61D 27/0027 62/229 |
| 5,265,435 | A | * | 11/1993 | Richardson .......... B60H 1/3222 62/133 |

(Continued)

FOREIGN PATENT DOCUMENTS

| EP | 3144607 | 3/2017 |
|---|---|---|
| WO | 0036481 | 6/2000 |

(Continued)

OTHER PUBLICATIONS

European Search Report issued in corresponding European Application No. 17211056.1 dated Mar. 14, 2018 (15 pages).

(Continued)

*Primary Examiner* — Rexford N Barnie
*Assistant Examiner* — Terrence R Willoughby
(74) *Attorney, Agent, or Firm* — Hamre, Schumann, Mueller & Larson, P.C.

(57) ABSTRACT

Methods and systems for providing power from an energy supply source having a limited charge to one or more self-contained climate controlled storage units are disclosed. The power is provided from an energy supply source having a limited charge to one or more self-contained climate controlled storage units in a transport unit. The method includes determining whether to supply power from the enemy supply source to the one or more self-contained climate controlled storage units; supplying power in response to the determining indicating that power is to be supplied; determining whether to continue supplying power from the energy supply source to the one or more self-contained climate controlled storage units; and stopping supplying power in response to the determining whether to continue indicating that power is no longer to be supplied.

17 Claims, 8 Drawing Sheets

(56) References Cited

U.S. PATENT DOCUMENTS

| | | | |
|---|---|---|---|
| 6,688,125 B2 * | 2/2004 | Okamoto | B60H 1/00428 62/239 |
| 8,287,514 B2 * | 10/2012 | Miller | A61M 5/1413 604/500 |
| 2002/0174666 A1 * | 11/2002 | Viegas | B60H 1/3205 62/131 |
| 2011/0114398 A1 * | 5/2011 | Bianco | B60L 50/66 180/65.1 |
| 2013/0000342 A1 * | 1/2013 | Blasko | B60H 1/00428 62/235.1 |
| 2015/0183292 A1 | 7/2015 | Muralidhar et al. | |
| 2015/0188360 A1 * | 7/2015 | Doane | H02J 7/35 307/29 |
| 2015/0231948 A1 * | 8/2015 | Kennedy | B60H 1/3222 62/56 |
| 2015/0246593 A1 * | 9/2015 | Larson | B60H 1/00014 62/56 |
| 2015/0328953 A1 | 11/2015 | Sulc et al. | |
| 2015/0353036 A1 * | 12/2015 | Pierce | B60R 16/033 307/9.1 |
| 2016/0334154 A1 | 11/2016 | Srichai et al. | |
| 2017/0210194 A1 * | 7/2017 | Ling | B60R 16/04 |

FOREIGN PATENT DOCUMENTS

| | | |
|---|---|---|
| WO | 0133149 | 5/2001 |
| WO | 2014058610 | 4/2014 |
| WO | 2016040435 | 3/2016 |
| WO | 2016196488 | 12/2016 |

OTHER PUBLICATIONS

"New Carrier Transicold Technology Uses Solar Panels to Maintain Refrigeration Unit Attery Power"; United Technologies, Carried Transicold, Sep. 25, 2014, retrieved from web http://www.ccs.utc.com/ccs/en/worldwide/.

* cited by examiner

LOAD MANAGEMENT IN A TRANSPORT UNIT OF A SELF-CONTAINED CLIMATE CONTROLLED STORAGE UNIT

FIELD

This disclosure relates generally to a self-contained climate controlled storage unit. More particularly, the disclosure relates to a method and system for managing one or more energy supply sources and one or more energy load sources in a transport unit for the self-contained climate controlled storage unit.

BACKGROUND

A self-contained climate controlled storage unit, such as a refrigerated air freight container (e.g., Thermo King Air 100-RKN, etc.), a portable refrigeration container (e.g., Thermo King Cold Cube™ containers, etc.), etc., provides portable climate controlled storage for cargo. In some instances, the cargo can be high value/critical cargo. These self-contained climate controlled storage units are typically battery powered. The batteries typically require battery charging prior to transport so that the unit can provide and maintain climate control (e.g., temperature, humidity, atmosphere, etc.) without external power. In many instances, regulatory agencies (e.g., Federal Aviation Administration—FAA, etc.) and trade associations (e.g., International Air Transport Association—IATA, etc.) provide regulations that impose strict performance specifications on self-contained climate controlled storage units. Failure to meet these regulations or attempts to modify these units once certified can result in refusal of certification and entry into, for example, an aircraft. Accordingly, modification to existing self-contained climate controlled storage units can be difficult if not impossible.

The cargo in a self-contained climate controlled storage unit can be at risk the longer the unit is delayed from reaching its destination. That is, the battery source providing power to the self-contained climate controlled storage unit can fully discharge and the climate control capacity of the unit can be exhausted. When this happens, the cargo can potentially fall out of compliance with climate control requirements. Loss or spoilage of cargo stored in the unit can occur.

SUMMARY

This disclosure relates generally to a self-contained climate controlled storage unit. More particularly, the disclosure relates to a method and system for managing one or more energy supply sources and one or more energy load sources in a transport unit for the self-contained climate controlled storage unit. In an embodiment, the energy supply source has a limited or finite charge amount. For example, in an embodiment the energy supply source can be a battery storage system that includes one or more batteries.

In an embodiment, a self-contained climate controlled storage unit includes an onboard power source (e.g., the self-contained climate controlled storage unit includes its own battery, etc.). In an embodiment, a mobile charging system is provided to extend a run time of a power source (e.g., the onboard battery) of a self-contained climate controlled storage unit. The mobile charging system can extend the run time prior to, during, or after transport of the self-contained climate controlled storage unit. In an embodiment, the onboard power source can be included as part of the self-contained climate controlled storage unit. In an embodiment, the self-contained climate controlled storage unit does not include an onboard power source. In such an embodiment, the mobile charging system can provide power to one or more components of the self-contained climate controlled storage unit.

In an embodiment, the self-contained climate controlled storage unit can be an air freight container. The embodiments described in this specification can provide power to charge the power source of the air freight container from an origination point to an airport. The embodiments can extend autonomous operation of the air freight container. In an embodiment, the air freight container may not include a power source. In such an embodiment, the embodiments described in this specification can provide power to the air freight container from a power source having a limited power supply.

In another example, the embodiments described herein can be used to charge an empty self-contained climate controlled storage unit prior to loading cargo for shipment. That is, while an empty unit is being transported back to a warehouse for loading, the unit can be charged. Accordingly, the out of service duration of the unit required for charging the unit while sitting in a warehouse can be reduced. This can provide faster turn-around time for using a unit leading to higher utilization of the unit and increased revenue for the unit owner.

The embodiments described herein can extend autonomous operation of a self-contained climate controlled storage unit using one or more charge sources including, for example, shore power, one or more solar panels, an alternator (e.g., an alternator driven by a transport refrigeration unit (TRU), an alternator driven by a tractor engine, etc.), an on-board generator, etc. These charge sources can charge the unit while in storage and/or during transport.

The embodiments described herein can prevent loss of cargo stored in a self-contained climate controlled storage unit when, for example, the self-contained climate controlled storage unit is delayed from reaching its final destination.

In one embodiment, a method for providing power from an energy supply source having a limited charge to one or more self-contained climate controlled storage units in a transport unit. The method includes determining whether to supply power from the energy supply source to the one or more self-contained climate controlled storage units. The method also includes supplying power in response to the determining indicating that power is to be supplied. Also, the method includes determining whether to continue supplying power from the energy supply source to the one or more self-contained climate controlled storage units. Further, the method includes stopping supplying power in response to the determining whether to continue indicating that power is no longer to be supplied.

In another embodiment, a mobile charging system for extending autonomous operation of an electrically powered self-contained climate controlled storage unit in a transport unit is provided. The system includes a power source and a system controller. The power source supplies power to the electrically powered self-contained climate controlled storage unit. The system controller is connected to the power source and to the self-contained climate controlled storage unit. The system controller is configured to control operation of the mobile charging system by communicating with the power source and the self-contained climate controlled storage unit.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

This disclosure relates generally to a self-contained climate controlled storage unit. More particularly, the disclosure relates to a method and system for managing one or more energy supply sources and one or more energy load sources in a transport unit for the self-contained climate controlled storage unit.

Self-contained climate controlled storage units can be transported in a refrigerated transport unit. The self-contained climate controlled storage units can be battery powered. The batteries can be supplied with an enemy supply source when the self-contained climate controlled storage units are in the refrigerated transport unit. Some self-contained climate controlled storage units may not include a battery. The self-contained climate controlled storage units can be supplied with an energy supply source when the self-contained climate controlled storage units are in the refrigerated transport unit.

In some cases, the energy supply source can be limited. For example, the energy supply source can be a battery storage system that is charged by an alternator, solar panels, or the like. If the self-contained climate controlled storage unit, which serves as an energy load source in this scenario, receives power from the energy supply source without limitation, the battery storage system can be drained to a point that no additional energy can be supplied to the energy load source. As a result, the self-contained climate controlled storage unit could have insufficient energy to power the unit, and the cargo stored within the self-contained climate controlled storage unit can reach temperatures that are unacceptable for the cargo contained therein. This can result in loss or spoilage of the cargo. In some cases, a plurality of self-contained climate controlled storage units can be transported in the refrigerated transport unit. In such cases, if the energy load sources are not managed, one of the energy load sources could drain the battery storage system without another of the energy load sources having had access to the energy supply source. In such cases, one or more of the plurality of self-contained climate controlled storage units may end up with loss or spoilage of the cargo.

Systems and methods described in this specification are directed to balancing one or more energy load sources (e.g., one or more self-contained climate controlled storage units, etc.) to share power from an energy supply source (e.g., a battery storage system, etc.) in a refrigerated transport unit. In an embodiment, the balancing may be based on, for example, a load demand of the one or more energy load sources; a duration in which the one or more energy load sources receives power from the energy supply source; a duration since the one or more energy load sources have received power from the energy supply source; a sensed condition corresponding to the one or more energy load sources (e.g., a temperature within the self-contained climate controlled storage unit, etc.); an estimated duration of transit time; a current weather condition; an estimated duration until another energy supply source is available; combinations thereof, or the like.

While some of the embodiments discussed below are discussed with respect to an air freight container, one skilled in the art would recognize the embodiments discussed herein can be provided for any type of electrically powered self-contained climate controlled storage unit (e.g., air freight containers, portable refrigerated storage boxes, etc.).

Figure 1A:
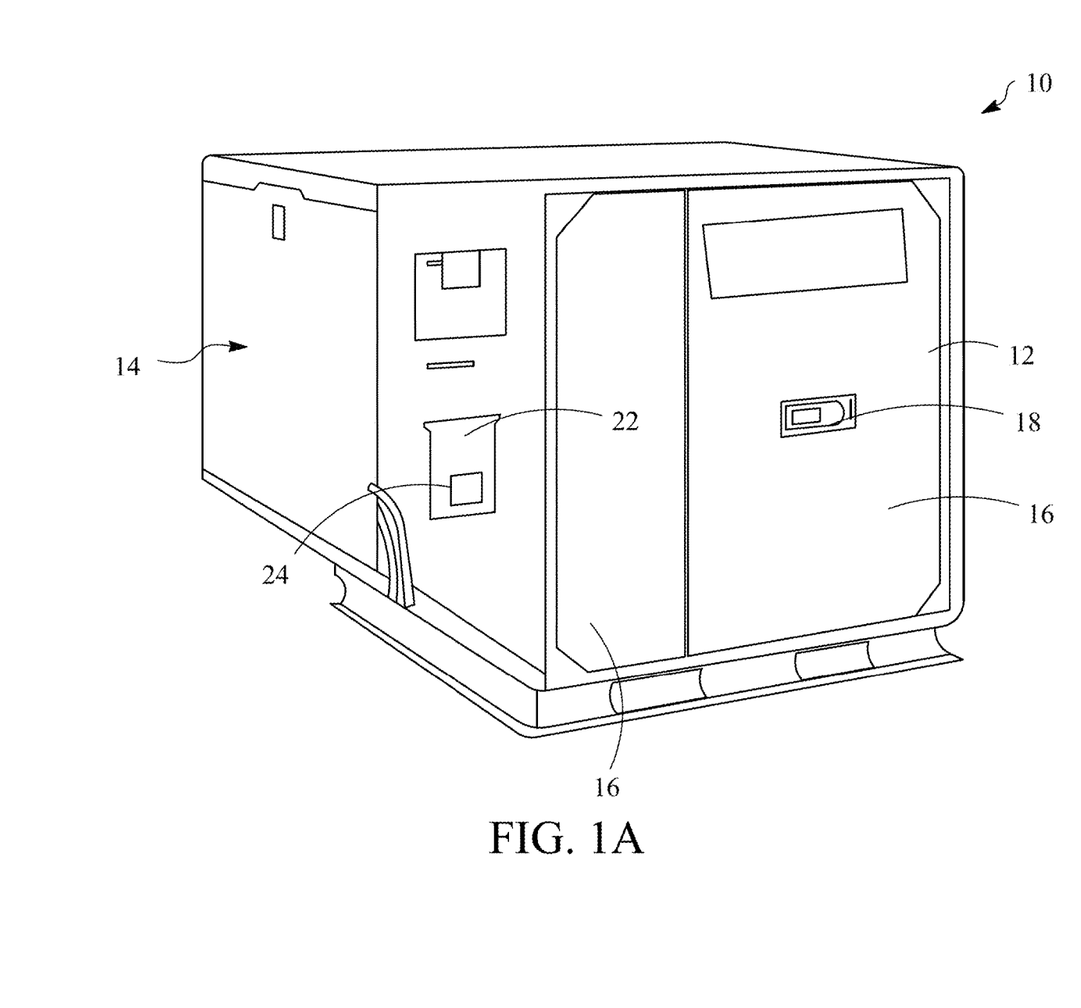
FIGS. 1A and 1B illustrate a self-contained climate controlled storage unit according to an embodiment.
Figure 1B:
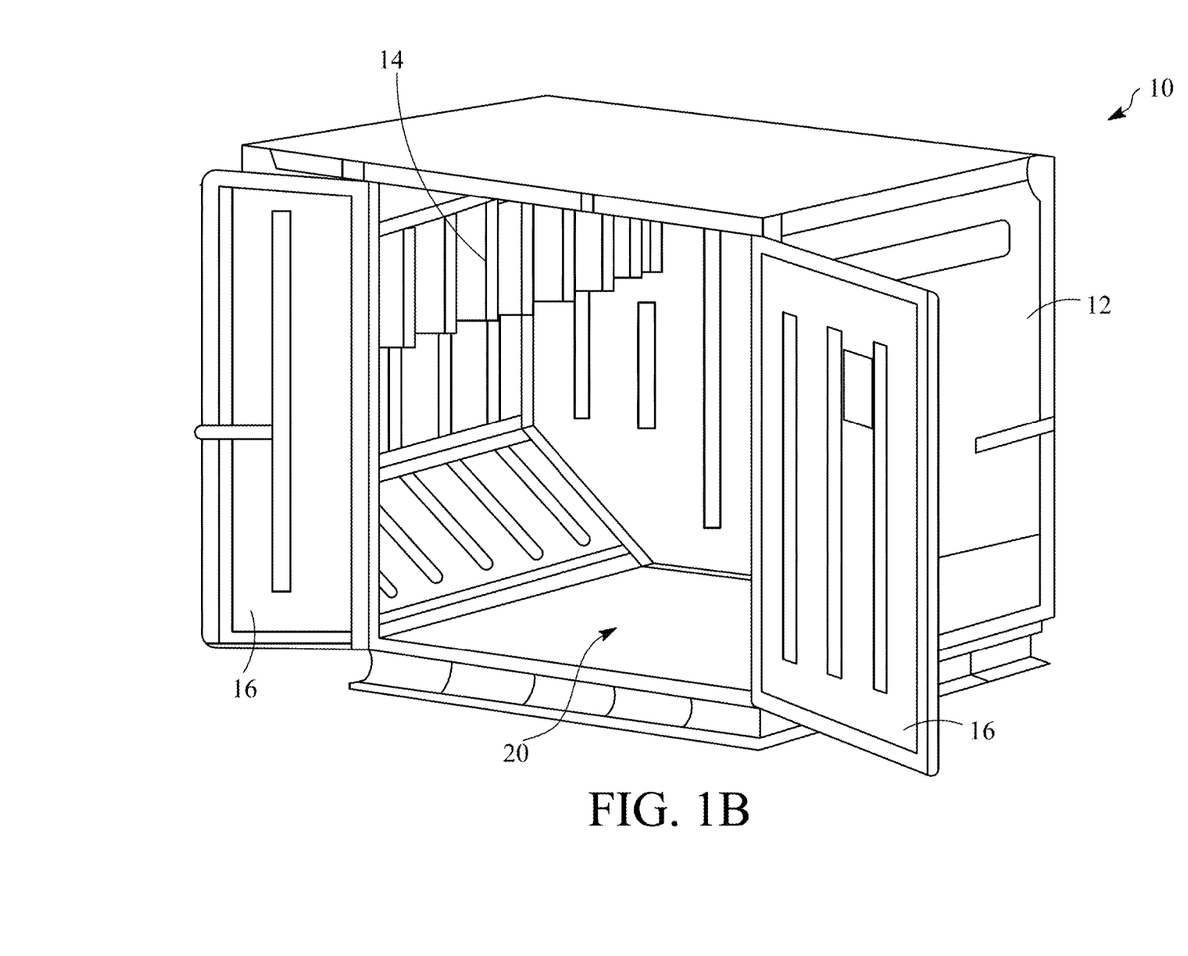

FIGS. 1A and 1B illustrate a refrigerated air freight container 10, according to an embodiment. For simplicity of this specification, the refrigerated air freight container 10 will be referred to as simply the container 10. The container 10 includes an insulated housing 12 for an interior space 20, a climate control unit 14, and a power and control unit 22.

In the illustrated embodiment, the insulated housing 12 includes insulated side, bottom, and top walls configured to generally conform to the shape required of the container 10. One end wall includes doors 16. The doors 16 are kept closed by a securing mechanism 18.

Access to the interior space 20 is provided via the doors 16. FIG. 1A illustrates a side perspective view of the air freight container 10 in which the doors 16 are closed. FIG. 1B illustrates another side perspective view of the air freight container 10 in which the doors 16 are open.

The climate control unit 14 is configured to provide climate control (e.g., temperature, humidity, atmosphere, etc.) within the interior space 20. In particular, the climate control unit 14 can provide climate control to maintain fresh and/or frozen cargo stored within the interior space 20. It will be appreciated that the particular cargo is not limiting. For example, in an embodiment, the cargo can include perishable items such as food, while in another embodiment the cargo can include pharmaceuticals which need to be maintained at a particular temperature. In an embodiment, the climate control unit 14 can include one or more refrigeration circuits (not shown). Each of the one or more refrigeration circuits can include, for example, a compressor, a condenser, an evaporator, and an expansion valve. In an embodiment, one or more condensers (not shown), one or more condenser fans (not shown), and one or more electrical components (e.g., valve(s)) (not shown) can be housed within the climate control unit 14. There can also be one or more evaporators (not shown) arid one or more evaporator fans (not shown) housed within one or both of the climate control unit 14 and the interior space 20 to provide climate control within the interior space 20.

The battery and control unit 22 is configured to power and control the climate control unit 14. The battery and control unit 22 includes, for example, a controller (not shown) and a battery source (not shown). In an embodiment, the battery and control unit 22 can also include a human machine interface (HMI) (not shown) that is powered by the battery source and configured to communicate with the controller. It will be appreciated that in an embodiment, the container 10 may not include a battery source and may be powered when connected to an external power source. The controller is configured to control, for example, the one or more electrical components, the compressor, the one or more condenser and/or evaporator fans, etc. The battery source is configured to provide electrical energy to, for example, the controller, the one or more electrical components, the compressor, the one or more condenser and/or evaporator fans, etc.

The battery source can include one or more battery banks (not shown) with a DC and/or AC charge input 24 configured to allow an external power source to charge the one or more battery banks. When charge input 24 includes a DC charge input, the battery source can also include a DC charge controller, a DC isolation connection, and a DC disconnect switch. When the charge input 24 includes an AC charge input, the battery source can also include an AC inverter, an AC charger, and an AC disconnect switch and a breaker panel. Embodiments of systems and methods for extending autonomous operation of a self-contained climate controlled storage unit, such as the container 10, are described in additional detail below.

Figure 2:
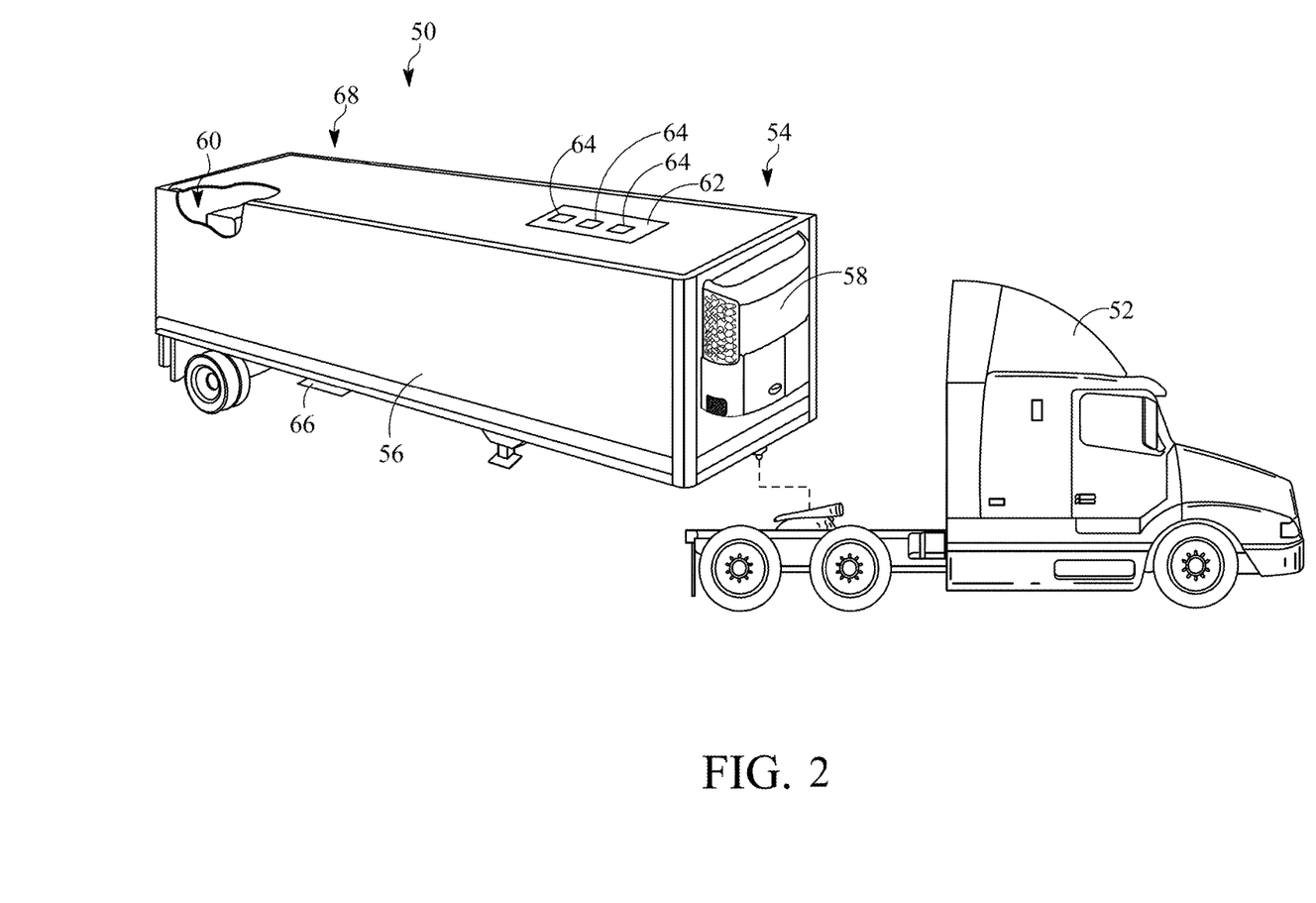
FIG. 2 illustrates a refrigerated transport unit attached to a tractor, according to an embodiment.

FIG. 2 illustrates a refrigerated transport unit 50 attached to a tractor 52, according to an embodiment. The refrigerated transport unit 50 includes a transport refrigeration system (TRS) 54, a mobile charging system 68, and a transport unit 56. The TRS 54 is configured to control a temperature of an internal space 60 of the transport unit 56. In particular, the TRS 54 is configured to transfer heat between an internal space 60 and the outside environment. In some embodiments, the TRS 54 is a multi-zone system in which different zones or areas of the internal space 60 are controlled to meet different refrigeration requirements based on the cargo stored in the particular zone. The TRS 54 includes a transport refrigeration unit (TRU) 58 for providing climate control within the internal space 60. The internal space 60 can store cargo including, for example, one or more self-contained climate controlled storage units that can be charged by the mobile charging system 68.

The mobile charging system 68 includes a solar charging unit 62 and a mobile charging system storage unit 66. The solar charging module 62 includes portions of a solar charging module of the mobile charging system 68 including a plurality of solar panel arrays 64. Each of the solar panel arrays 64 include a plurality of solar panels (not shown). In some embodiments, the solar charging unit 62 can be used by the mobile charging system 68 and provide electrical energy for use by the TRS 54.

The mobile charging system storage unit 66 can store portions of the mobile charging system 68 including, for example, a battery bank (not shown), remaining portions of a solar charge module (not shown), an AC inverter charge module (not shown), a DC charge module (not shown), a DC charge controller (not shown), etc.

Figure 3:
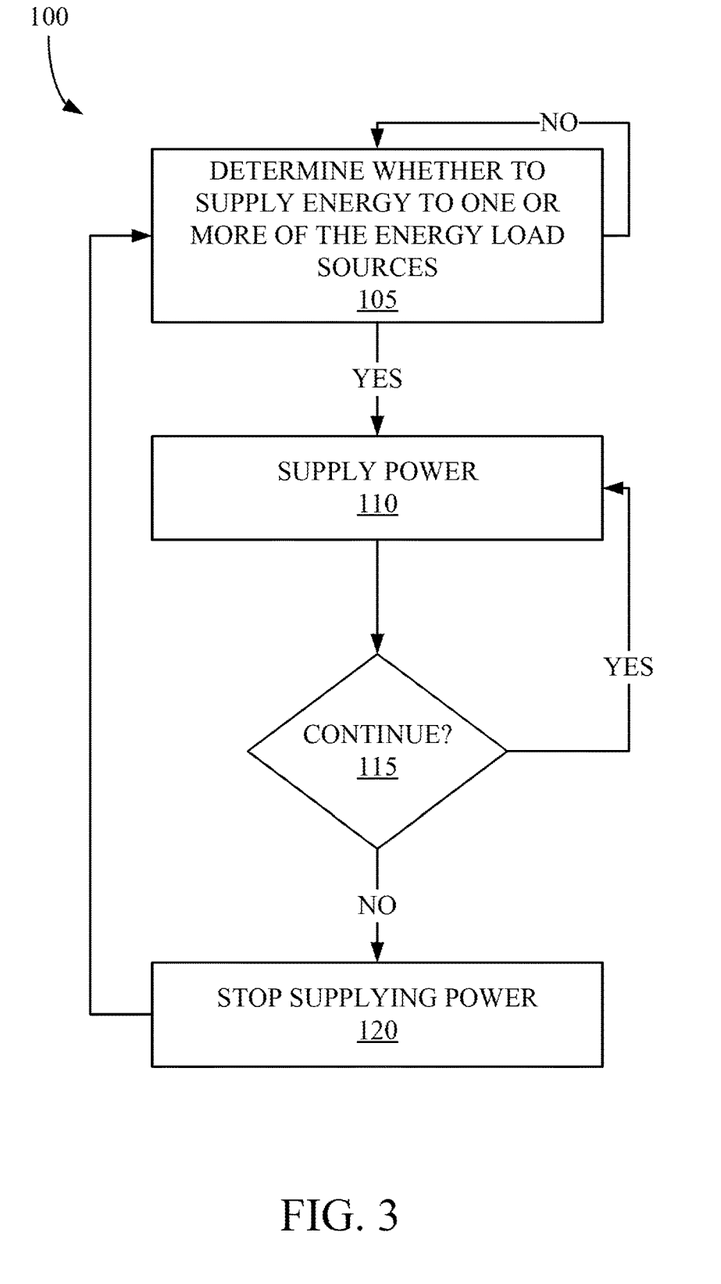
FIG. 3 is a flowchart of a method for providing power from an energy supply source to one or more energy load sources, according to an embodiment.

FIG. 3 is a flowchart of a method 100 for providing power from an energy supply source to one or more energy load sources, according to an embodiment. The method 100 generally can be performed to selectively provide power from the energy supply source to the one or more energy load sources. In an embodiment, the energy supply source can be a battery storage system. In general, the energy supply source includes a limited charge (e.g., a limited or finite amount of energy that can be supplied to the one or more energy load sources). It will be appreciated that a source for the energy supply source is not intended to be limiting. Accordingly, the energy supply source can receive power from one or more sources. For example, in an embodiment in which the energy supply source is a battery storage system, the battery storage system can be charged by, for example, one or more solar panels, an alternator, etc.

At 105, a controller (e.g., a controller of the mobile charging system 68 in FIG. 2) determines whether to supply power to one or more energy load sources. In an embodiment, the one or more energy load sources are self-contained climate controlled storage units (e.g., the container 10 in FIG. 1). The determination at 105 can be based on a variety of different selection criteria. Examples of suitable criteria include, but are not limited to, a load demand of the one or more energy load sources; a duration in which the one or more enemy load sources receives power from the energy supply source; a duration since the one or more energy load sources have received power from the energy supply source; a sensed condition corresponding to the one or more energy load sources (e.g., a temperature within the self-contained climate controlled storage unit, a rate of change of the temperature within the self-contained climate controlled storage unit, etc.); an estimated duration of transit time; a current weather condition; an estimated duration until another energy supply source is available; combinations thereof, or the like. Several examples are discussed in additional detail in accordance with the figures that follow.

If a determination is made to supply power from the energy supply source to one or more of the one or more energy load sources, power is supplied at 110. If a determination is made not to supply power from the energy supply source to one or more of the one or more energy load sources, the controller continues to determine whether to supply power at 105.

At 115, the controller determines whether to continue supplying power from the energy supply source to the one or more energy load sources. The determination at 115 can be based on a variety of factors including, but not limited to, determinations similar to those made in 105. That is, the determination at 115 can be based on, for example, a load demand of the one or more energy load sources; a duration in which the one or more energy load sources receives power from the energy supply source; a duration since the one or more energy load sources have received power from the energy supply source; a sensed condition corresponding to the one or more energy load sources (e.g., a temperature within the self-contained climate controlled storage unit, a rate of change of the temperature within the self-contained climate controlled storage unit, etc.); an estimated duration of transit time; a current weather condition; an estimated duration until another energy supply source is available; combinations thereof, or the like.

If the determination is made to continue, the method 100 continues supplying power at 110. If the determination is made to stop supplying power based on the above criteria, then the controller stops supplying power from the energy supply source to one or more of the one or more energy load sources at 120.

In an embodiment, upon stopping the supply of power from the energy supply source, the method 100 can be performed again by the controller. That is, the method 100 can return to 105 and determine whether to supply power to one or more of the one or more energy load sources. It will be appreciated that the method 100 can be continuously performed when, for example, the one or more load sources are electrically connected to the mobile charging system.

FIGS. 4A-4D are flowcharts including methods 100A-100D for providing power from an energy supply source to one or more energy load sources according to the method 100 in FIG. 3, according to some embodiments. The methods illustrated in FIGS. 4A-4D include specific embodiments for some aspects of the method 100 described in accordance with FIG. 3 above. For simplicity of this specification, aspects of the method 100 are illustrated in FIGS. 4A-4D for clarifying a relationship of the features. It will be appreciated that the methods 100A-100D in FIGS. 4A-4D can be implemented individually or in combinations thereof.

Figure 4A:
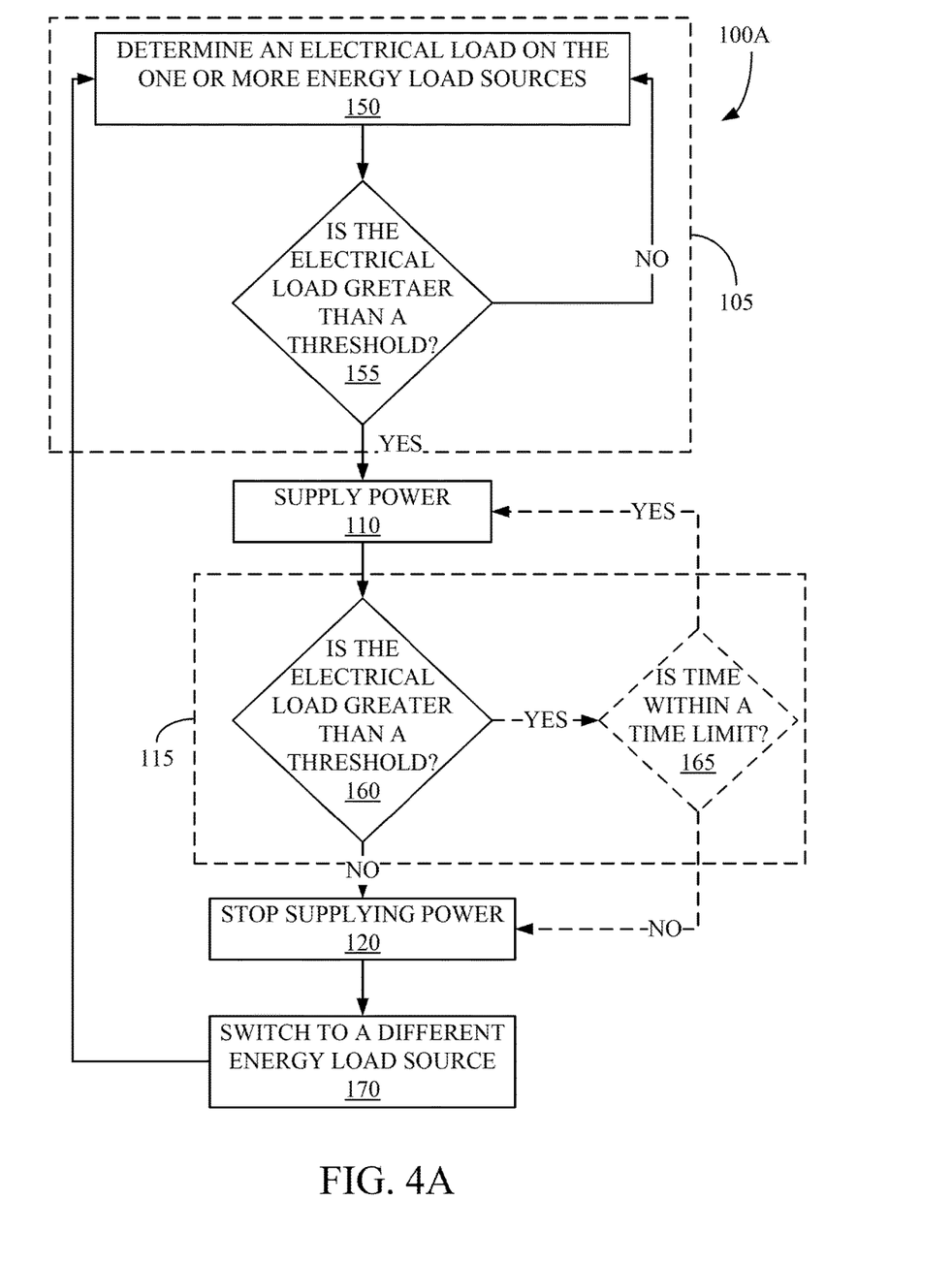
FIGS. 4A-4D are flowcharts including methods for providing power from an energy supply source to one or more energy load sources according to the method in FIG. 3, according to some embodiments.

FIG. 4A illustrates a flowchart for a method 100A, according to an embodiment. The method 100A is generally directed to the method 100 described in accordance with FIG. 3. The method 100A includes a specific embodiment in which the determination as to whether to provide power from the energy supply source to the one or more energy load sources depending upon an electrical load (e.g., a load current, a load power, a load voltage, etc.) of the one or more energy load sources.

At 150, a controller (e.g., a controller of the mobile charging system 68 in FIG. 2) determines an electrical load on one or more of the one or more energy load sources. The controller can determine the current by, for example, receiving a current value from one or more current sensors. At 155 the controller determines whether the electrical load of a first of the one or more energy load sources is greater than a threshold electrical load. If the electrical load is greater than the threshold electrical load, power is supplied at 110 from the energy supply source to the first of the one or more energy load sources. At 160, the controller again determines the electrical load and determines whether the electrical load is greater than the threshold electrical load. If the electrical load is still greater than the threshold electrical load, the controller can continue supplying power at 110. Optionally, the controller can determine whether a duration of the power being supplied to the energy load source is greater than a time threshold at 165. If the duration is less than the time threshold, then power can continue to be supplied at 110. If the electrical load is less than the threshold electrical load at 160 or the duration is greater than the time threshold at 165, the method 100A can proceed to 120 and discontinue supplying power to the energy load source. In an embodiment in which there are a plurality of energy load sources, the controller can supply power switch to a different one of the plurality of energy load sources at 170. The method 100A can then be repeated.

By execution of the method 100A, power can be supplied to a first of a plurality of energy load sources, then a second, then a third, etc. If the method 100A cycles through each of the plurality of energy load sources, then the method 100A can start again with the first energy load source. The method 100A can execute until the energy supply source is depleted or a destination is reached and the energy load sources are electrically disconnected from the mobile charging system.

Figure 4B:
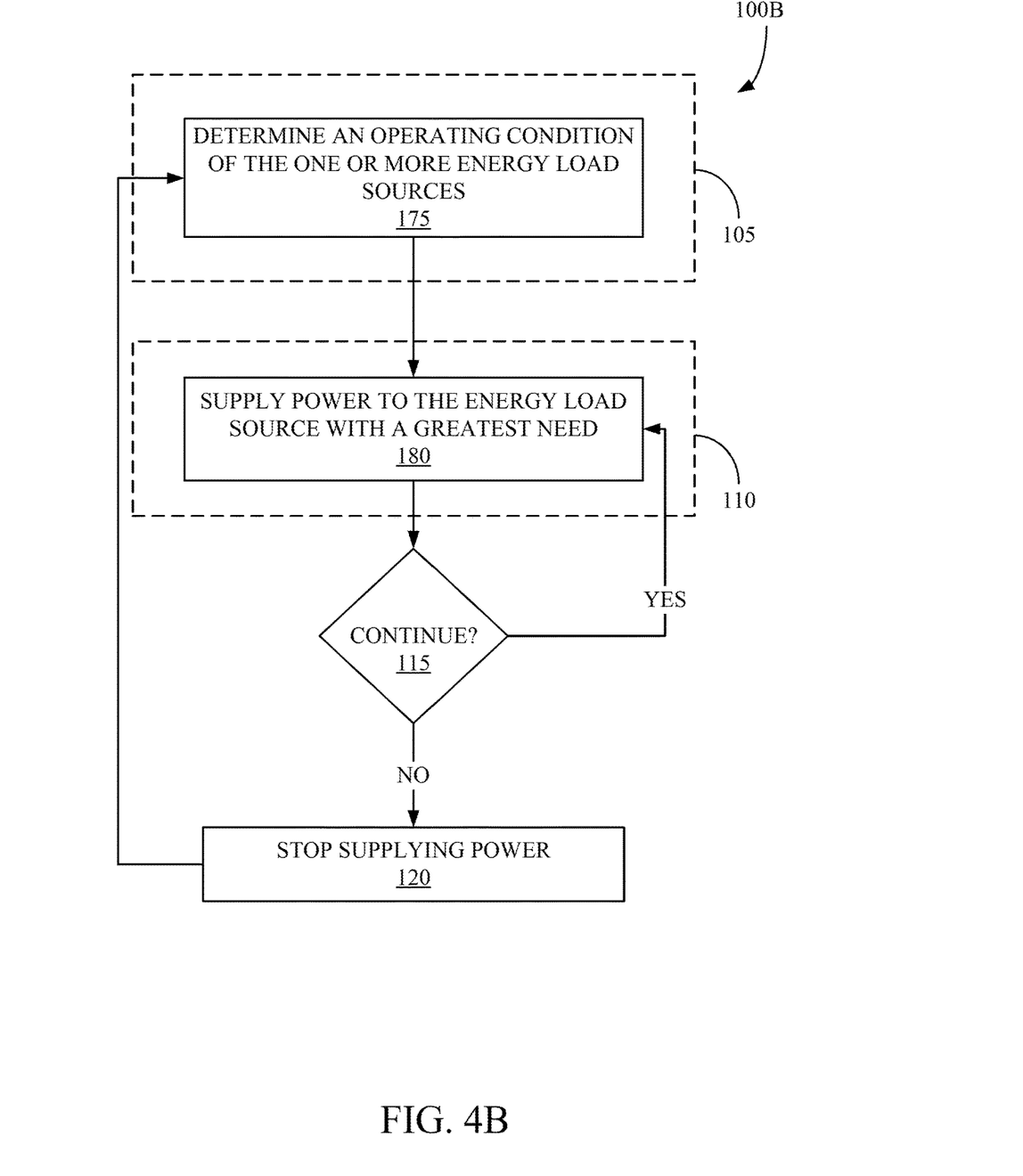

FIG. 4B illustrates a flowchart for a method 100B, according to an embodiment. The method 100B is generally directed to the method 100 described in accordance with FIG. 3. The method 100B includes a specific embodiment in which the determination as to whether to provide power from the energy supply source to the one or more energy load sources depending upon an operating condition of the one or more energy load sources.

At 175, a controller (e.g., a controller of the mobile charging system 68 in FIG. 2) determines an operating condition of the one or more energy load sources. For example, the operating condition can include a temperature of the cargo or the interior space in a self-contained climate controlled storage unit (e.g., the self-contained climate controlled storage unit 10 in FIGS. 1A-1B). In an embodiment, the operating condition can include both the temperature of the cargo and the temperature of the interior space. In an embodiment, the operating condition also includes a battery voltage of the self-contained climate controlled storage unit.

At 180, the controller can supply power from the energy supply source (e.g., mobile charging system 68 of FIG. 2) to the energy load source of the one or more energy load sources that has a greatest need for supplemental power. For example, the controller can supply power from the energy supply source to the energy load source which has an operating condition one or more of a relatively lowest battery level and a temperature that is relatively most critical (e.g., the temperature is furthest from a desired set point, closest to an unacceptable temperature at which loss or spoilage could occur, etc.).

At 115, the controller determines whether to continue supplying power from the energy supply source to the enemy load source. This determination can include, for example, determining whether there is another energy load source that has become the energy load source having the greatest need for supplemental power. In an embodiment, this can include determining whether the operating condition has reached an acceptable level. An acceptable level can vary depending on, for example, a type of cargo in the self-contained climate controlled storage unit, etc. In an embodiment, an acceptable level can be a temperature that is greater than a set point temperature of the self-contained climate controlled storage unit. In an embodiment, an acceptable level can be a temperature that is less than a set point temperature of the self-contained climate controlled storage unit. In an embodiment, the acceptable level may be a temperature that is offset by a selected amount from the set point temperature.

If the decision is made to continue at 115, the controller continues supplying power to the energy load source at 180. If the decision is made to not continue at 115, the controller stops supplying power from the energy supply source to the energy load source at 120. The method 100B can execute until the energy supply source is depleted or a destination is reached and the energy load sources are electrically disconnected from the mobile charging system.

By execution of the method 100B, power can be supplied to a first of a plurality of energy load sources, then a second, then a third, etc. If the method 100B cycles through each of the plurality of energy load sources, then the method 100B can start again with the first energy load source. The method 100B can execute until the energy supply source is depleted or a destination is reached and the energy load sources are electrically disconnected from the mobile charging system.

Figure 4C:
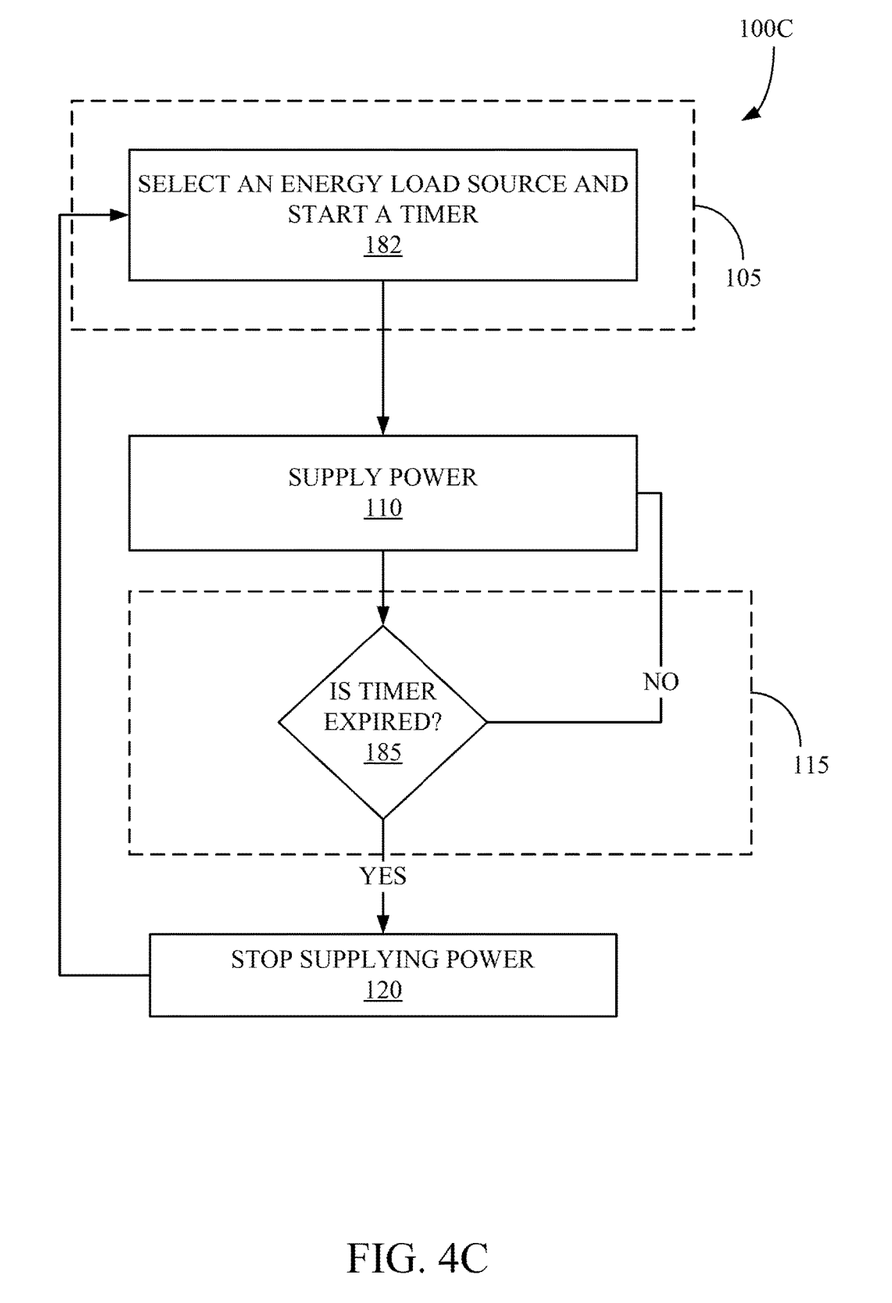

FIG. 4C illustrates a flowchart for a method 100C, according to an embodiment. The method 100C is generally directed to the method 100 described in accordance with FIG. 3. The method 100C includes cycling through the one or more energy load sources and supplying power from the energy supply source for a duration of a timer to each of the one or more energy load sources.

At 182, a controller (e.g., a controller of the mobile charging system 68 in FIG. 2) selects one of the one or more energy load sources and starts a timer. At 110, the controller supplies power from the energy supply source to the selected energy load source. At 185 the controller determines whether the timer is expired. If the timer is not expired, the controller continues to supply power at 110. If the time is expired, the controller stops supplying power at 120. The method 100C can then repeat for a next of the one or more energy load sources.

By execution of the method 100C, power can be supplied to a first energy load source for a selected period of time, then a second, then a third, etc. If the method 100C cycles through each of the energy load sources, then the method 100C can begin again with the first energy load source. The method 100C can execute until the energy supply source is depleted or a destination is reached and the energy load sources are electrically disconnected from the mobile charging system.

Figure 4D:
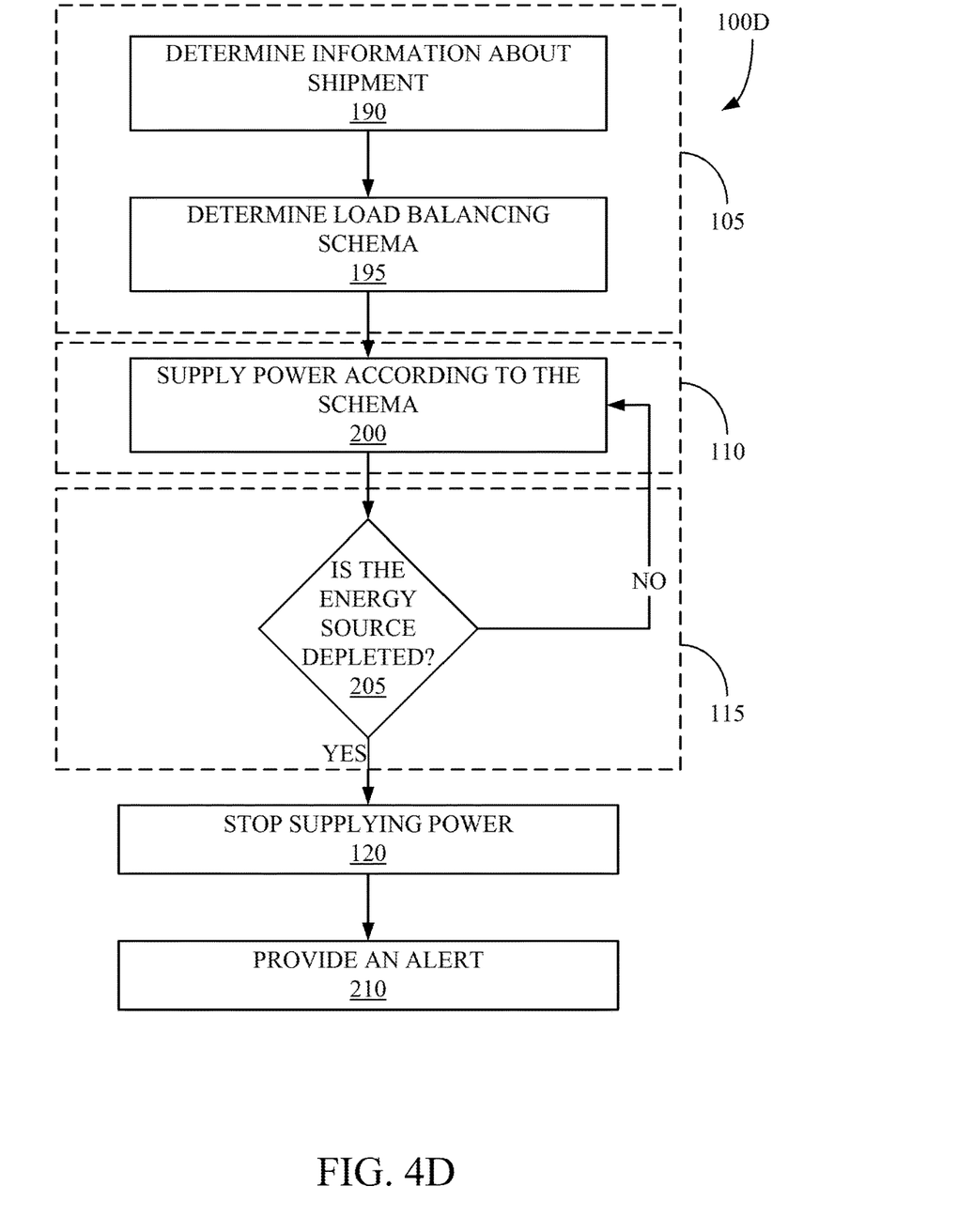

FIG. 4D illustrates a flowchart for a method 100D, according to an embodiment. The method 100D is generally directed to the method 100 described in accordance with FIG. 3. The method 100D includes a specific embodiment in which the determination as to whether to provide power from the energy supply source to the one or more energy load sources depending upon information about, for example, the shipment, weather conditions, etc.

At 190, a controller (e.g., a controller of the mobile charging system 68 in FIG. 2) determines information about a shipment that includes one or more energy load sources (e.g., self-contained climate controlled storage unit 10 in FIGS. 1A-1B). The shipment information can include a variety of information. Examples of suitable information include, but are not limited to, a duration of the shipment; an estimated time of arrival; a geolocation (e.g., a global position system (GPS) location) of the transport unit; a time of day; a weather forecast; an expected transit route; intended stops during transit; or the like. It will be appreciated that the shipment information can include combinations or subsets of the shipment information, according to an embodiment. In an embodiment, the shipment information can include driver log data as obtained from an electronic logging device (ELD) associated with the transport unit.

At 195, the controller selects a load balancing schema according to which power can be selectively provided to the self-contained climate controlled storage units. The load balancing schema takes into account the determined shipment information to estimate a duration and order by which to supply power from the energy supply source to the one or more energy load sources. In an embodiment, a load balancing schema can include, for example, providing power from the energy supply source to the self-contained climate controlled storage unit which is furthest from its set point, and switching to provide power to a second self-contained climate controlled storage unit when it is determined that the second self-contained climate controlled storage unit is the furthest from its set point. The schema can, for example, attempt to control the power supplied from the energy supply source so that the charge in the energy supply source lasts as long as possible during the trip duration before being depleted. In an embodiment, the schema can account for recharging of the energy supply source when, for example, the transport unit is stopped and receives charge (e.g., via shore power, etc.).

At 200, the controller supplies power from the energy supply source to the one or more energy load sources according to the determined schema. At 205, the controller determines whether the energy supply source is depleted. If not, the controller continues supplying power according to the schema. If the energy source is depleted, the controller stops supplying power at 120. It will be appreciated that the energy source being depleted may not be an indication that no charge is available in the energy source, but that the energy source is below a selected charge level. After stopping the supply of power, the controller provides an alert at 210 indicating that the energy source is depleted. The alert can, for example, be a notification to a driver, a dispatcher, or other party controlling the shipment so that some further action can be taken to reduce a likelihood of spoilage or loss.

By execution of the method 100D, power can be supplied to the energy load sources in a manner that accounts for real world conditions such as, for example, the weather, traffic delays, etc.

It will be appreciated that the methods 100A-100D can be implemented individually, or in combinations thereof, up to and including combining each of 100A-100D.

Aspects:

It is to be appreciated that any one of aspects 1-11 can be combined with any one of aspects 12-20.

Aspect 1. A method for providing power from an energy supply source having a limited charge to one or more self-contained climate controlled storage units in a transport unit, the method comprising:
determining whether to supply power from the energy supply source to the one or more self-contained climate controlled storage units;
supplying power in response to the determining indicating that power is to be supplied;
determining whether to continue supplying power from the energy supply source to the one or more self-contained climate controlled storage units; and
stopping supplying power in response to the determining whether to continue indicating that power is no longer to be supplied.

Aspect 2. The method according to aspect 1, wherein the determining whether to supply power from the energy supply source to the one or more self-contained climate controlled storage units further comprises determining an electrical load on the one or more self-contained climate controlled storage units, and indicating that power is to be supplied when the electrical load is greater than a threshold electrical load.

Aspect 3. The method according to aspect 2, wherein the determining whether to continue supplying power from the energy supply source to the one or more self-contained climate controlled storage units includes determining to stop supplying power when the electrical load on the one or more self-contained climate controlled storage units is less than the threshold electrical load.

Aspect 4. The method according to any one of aspects 1-3, wherein the determining whether to supply power from the energy supply source to the one or more self-contained climate controlled storage units further comprises determining an operating condition of the one or more self-contained climate controlled storage units, the operating condition indicating a charge level of a power source of the self-contained climate controlled storage units, and the operating condition indicating a temperature of an interior space of the self-contained climate controlled storage units, and indicating that power is to be supplied to a first of the one or more self-contained climate controlled storage units having the operating condition that indicates a highest priority load.

Aspect 5. The method according to aspect 4, wherein the determining whether to continue supplying power from the energy supply source to the one or more self-contained climate controlled storage units includes determining to stop supplying power when the operating condition is within an acceptable level.

Aspect 6. The method according to any one of aspects 1-5, wherein the determining whether to supply power from the energy supply source to the one or more self-contained climate controlled storage units further comprises selecting one of the one or more self-contained climate controlled storage units and starting a timer.

Aspect 7. The method according to aspect 6, wherein the determining whether to continue supplying power from the energy supply source to the one or more self-contained climate controlled storage units includes determining to stop supplying power when the timer is completed.

Aspect 8. The method according to any one of aspects 1-7, wherein the determining whether to supply power from the energy supply source to the one or more self-contained climate controlled storage units further comprises setting a load balancing schema based on shipment information.

Aspect 9. The method according to aspect 8, wherein the shipment information includes one or a combination of: a duration of the shipment; an estimated time of arrival; a geolocation (e.g., a global position system (GPS) location) of the transport unit; a time of day; a weather forecast; an expected transit route; and intended stops during transit.

Aspect 10. The method according to aspect 8, further comprising providing an alert indicating the energy supply source is depleted following the stopping supplying power.

Aspect 11. The method according to any one of aspects 1-10, wherein the determining whether to continue supplying power from the energy supply source to the one or more self-contained climate controlled storage units includes determining whether a charge of the energy supply source is below a threshold level.

Aspect 12. A mobile charging system for extending autonomous operation of an electrically powered self-contained climate controlled storage unit in a transport unit, comprising:

a power source for supplying power to the electrically powered self-contained climate controlled storage unit; and a system controller connected to the power source and connected to the self-contained climate controlled storage unit, wherein the system controller is configured to control operation of the mobile charging system by communicating with the power source and the self-contained climate controlled storage unit.

Aspect 13. The mobile charging system according to aspect 12, wherein the system controller is configured to selectively provide power to the self-contained climate controlled storage unit.

Aspect 14. The mobile charging system according to any one of aspects 12-13, wherein the system controller is configured to selectively provide power to the self-contained climate controlled storage unit until the power source is depleted.

Aspect 15. The mobile charging system according to any one of aspects 12-14, wherein the system controller is configured to provide an alert when the power source is depleted.

Aspect 16. The mobile charging system according to any one of aspects 12-15, wherein the system controller is configured to determine whether to supply power from the power source to the self-contained climate controlled storage unit, supply power in response to a determination that power is to be supplied, determine whether to continue supplying power from the power source to the self-contained climate controlled storage unit, and stop supplying power in response to the determining whether to continue indicating that power is no longer to be supplied.

Aspect 17. The mobile charging system according to any one of aspects 12-16, wherein the power source further comprises one or more charging sources configured to provide additional charge to the power source.

Aspect 18. The mobile charging system according to any one of aspects 12-17, wherein the power source has a limited charge.

Aspect 19. The mobile charging system according to any one of aspects 12-18, wherein the power source includes one or more batteries.

Aspect 20. The mobile charging system according to any one of aspects 12-19, wherein the self-contained climate controlled storage unit includes an onboard power source and the power source of the mobile charging system is further configured to charge the onboard power source of the self-contained climate controlled storage unit.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method, comprising: unit, the method comprising:
determining, by a controller of a mobile charging system on a transport unit having a transport refrigeration system, whether to supply power from an energy supply source of the mobile charging system to one or more self-contained climate controlled storage units, the energy supply source having a limited charge, each of the one or more self-contained climate controlled storage units including an interior space, a battery and control unit, and a climate control unit, the battery and control unit including a controller and a battery source, the climate control unit providing climate control to the interior space of the one or more self-contained climate controlled storage units, the determining being based on one or more of a timer, an electrical load on the battery source, an operating condition of the self-contained climate controlled storage unit, and shipping information;

supplying power from the energy supply source of the mobile charging system to the battery source of the one or more self-contained climate controlled storage units in response to the determining indicating that power is to be supplied;

determining, by the controller of the mobile charging system, whether to continue supplying power from the energy supply source of the mobile charging system to the battery source of the one or more self-contained climate controlled storage units; and stopping supplying power to the battery source in response to the determining whether to continue indicating that power is no longer to be supplied.

2. The method according to claim 1, wherein the determining whether to supply power from the energy supply source of the mobile charging system to the the one or more self-contained climate controlled storage units further comprises determining the electrical load on the battery source of the one or more self-contained climate controlled storage units, and indicating that power is to be supplied when the electrical load is greater than a threshold electrical load.

3. The method according to claim 2, wherein the determining whether to continue supplying power from the energy supply source of the mobile charging system to the battery source of the one or more self-contained climate controlled storage units includes determining to stop supplying power when the electrical load on the battery source of the one or more self-contained climate controlled storage units is less than the threshold electrical load.

4. The method according to claim 1, wherein the determining whether to supply power from the energy supply source of the mobile charging system to the battery source of the one or more self-contained climate controlled storage units further comprises:
determining the operating condition of the battery source and the controller of the one or more self-contained climate controlled storage units, the operating condition indicating a charge level of the battery source of the one or more self-contained climate controlled storage units, and the operating condition indicating a temperature of the interior space of the one or more self-contained climate controlled storage units, and indicating that power is to be supplied to a first of the battery sources of the one or more self-contained climate controlled storage units having the operating condition that indicates a highest priority load.

5. The method according to claim 4, wherein the determining whether to continue supplying power from the energy supply source of the mobile charging system to the battery source of the one or more self-contained climate controlled storage units includes determining to stop supplying power when the operating condition is within an acceptable level.

6. The method according to claim 1, wherein the determining whether to supply power from the energy supply source of the mobile charging system to the battery source of the one or more self-contained climate controlled storage units further comprises selecting one of the one or more self-contained climate controlled storage units and starting the timer.

7. The method according to claim 6, wherein the determining whether to continue supplying power from the energy supply source of the mobile charging system to the battery source of the one or more self-contained climate controlled storage units includes determining to stop supplying power to the battery source when the timer is completed.

8. The method according to claim 1, wherein the determining whether to supply power from the energy supply source of the mobile charging system to the battery source of the one or more self-contained climate controlled storage units further comprises setting a load balancing schema based on the shipment information.

9. The method according to claim 8, wherein the shipment information includes one or a combination of: a duration of the shipment; an estimated time of arrival; a geolocation (e.g., a global position system (GPS) location) of the transport unit; a time of day; a weather forecast; an expected transit route; and intended stops during transit.

10. The method according to claim 8, further comprising providing an alert indicating the energy supply source of the mobile charging system is depleted following the stopping supplying power.

11. The method according to claim 1, wherein the determining whether to continue supplying power from the energy supply source of the mobile charging system to the battery source of the one or more self-contained climate controlled storage units includes determining whether a charge of the energy supply source of the mobile charging system is below a threshold level.

12. A system, comprising:
a transport unit;
an electrically powered self-contained climate controlled storage unit configured to be loaded into the transport unit, the self-contained climate controlled storage unit including:
a battery and control unit having a battery source and a controller;
an interior space; and
a climate control unit powered by the battery source, the climate control unit configured to provide climate control to the interior space of the one or more self-contained storage units;
a mobile charging system for extending autonomous operation of the self-contained climate controlled storage unit, the mobile charging system including:
a power source having a limited charge; and
a system controller connected to the power source and connected to the self-contained climate controlled storage unit, wherein the system controller is configured to control operation of the mobile charging system by communicating with the power source and the self-contained climate controlled storage unit to selectively provide power to the battery source of the self-contained climate controlled storage unit, whether to provide power to the battery source being based on one or more of a timer, an electrical load on the battery source, an operating condition of the self-contained climate controlled storage unit, and shipping information.

13. The mobile charging system according to claim 12, wherein the system controller is configured to selectively provide power to the battery source of the self-contained climate controlled storage unit until the power source is depleted.

14. The mobile charging system according to claim 12, wherein the system controller is configured to provide an alert when the power source is depleted.

15. The mobile charging system according to claim 12, wherein the system controller is configured to determine whether to supply power from the power source to the battery source of the self-contained climate controlled storage unit, supply power in response to a determination that power is to be supplied, determine whether to continue supplying power from the power source to the battery source of the self-contained climate controlled storage unit, and stop supplying power in response to the determining whether to continue indicating that power is no longer to be supplied.

16. The mobile charging system according to claim 12, wherein the power source further comprises one or more charging sources configured to provide additional charge to the power source.

17. The mobile charging system according to claim 12, wherein the power source includes one or more batteries.

* * * * *